US008992047B2

(12) United States Patent
Boxler et al.

(10) Patent No.: US 8,992,047 B2
(45) Date of Patent: Mar. 31, 2015

(54) APPARATUS, METHOD, AND SYSTEM FOR HIGHLY CONTROLLED LIGHT DISTRIBUTION USING MULTIPLE LIGHT SOURCES

(71) Applicant: Musco Corporation, Oskaloosa, IA (US)

(72) Inventors: Lawrence H. Boxler, Oskaloosa, IA (US); Chris P. Lickiss, Newton, IA (US); Luke C. McKee, Oskaloosa, IA (US)

(73) Assignee: Musco Corporation, Oskaloosa, IA (US)

( * ) Notice: Subject to any disclaimer, the term of this patent is extended or adjusted under 35 U.S.C. 154(b) by 216 days.

(21) Appl. No.: 13/659,515

(22) Filed: Oct. 24, 2012

(65) Prior Publication Data

US 2013/0044481 A1    Feb. 21, 2013

Related U.S. Application Data

(63) Continuation of application No. 12/751,519, filed on Mar. 31, 2010, now Pat. No. 8,449,144, which is a continuation-in-part of application No. PCT/US2009/057090, filed on Sep. 16, 2009, (Continued)

(51) Int. Cl.
*F21V 7/00* (2006.01)
*F21K 99/00* (2010.01)
(Continued)

(52) U.S. Cl.
CPC ............. *F21V 7/0083* (2013.01); *F21K 9/00* (2013.01); *F21V 14/04* (2013.01); *F21V 17/02* (2013.01); *G02B 19/0066* (2013.01); *G02B 19/0023* (2013.01); *G02B 19/0028* (2013.01); *F21V 7/0025* (2013.01); *F21S 8/08* (2013.01);
(Continued)

(58) Field of Classification Search
USPC .......................................... 362/249.02, 311.02
See application file for complete search history.

(56) References Cited

U.S. PATENT DOCUMENTS 4,450,507 A    5/1984  Gordin
5,253,336 A   10/1993  Yamada
(Continued)

FOREIGN PATENT DOCUMENTS

CA    2 727 258 A1   12/2009
CN    101169232 A    4/2008
(Continued)

OTHER PUBLICATIONS

Musco Corporation, PCT/US2010034530 filed May 12, 2010, "European Search Report", mail date Nov. 25, 2013.
(Continued)

*Primary Examiner* — Laura Tso
(74) *Attorney, Agent, or Firm* — McKee, Voorhees & Sease

(57) ABSTRACT

Disclosed herein are apparatus, method, and system for producing a customizable composite beam from a plurality of solid state light sources. Each light source is associated with individually adjustable fixture components which allow for a variety of lighting needs to be addressed. The composite beam is a collective of the beam projected from each adjustable component/light source combination; each individual beam being of customized shape or standard shape.

10 Claims, 17 Drawing Sheets

Related U.S. Application Data application No. 13/659,515, which is a continuation-in-part of application No. 12/467,160, filed on May 15, 2009, now Pat. No. 8,356,916.

(60) Provisional application No. 61/097,483, filed on Sep. 16, 2008, provisional application No. 61/054,089, filed on May 16, 2008.

(51) Int. Cl.

| | | |
|---|---|---|
| *F21V 14/04* | (2006.01) | |
| *F21V 17/02* | (2006.01) | |
| *G02B 19/00* | (2006.01) | |
| *F21S 8/08* | (2006.01) | |
| *F21V 7/09* | (2006.01) | |
| *F21V 19/00* | (2006.01) | |
| *F21V 21/30* | (2006.01) | |
| *F21V 29/00* | (2006.01) | |
| *F21W 131/103* | (2006.01) | |
| *F21W 131/105* | (2006.01) | |
| *F21W 131/107* | (2006.01) | |
| *F21Y 101/02* | (2006.01) | |
| *F21Y 105/00* | (2006.01) | |

(52) U.S. Cl.
CPC ............... *F21V7/09* (2013.01); *F21V 19/001* (2013.01); *F21V 21/30* (2013.01); *F21V 29/004* (2013.01); *F21W 2131/103* (2013.01); *F21W 2131/105* (2013.01); *F21W 2131/107* (2013.01); *F21Y 2101/02* (2013.01); *F21Y 2105/001* (2013.01); *F21V 7/0066* (2013.01)
USPC ...... 362/249.02; 362/243; 362/145; 362/240; 362/247

(56) References Cited

U.S. PATENT DOCUMENTS

| | | |
|---|---|---|
| 5,906,425 A | 5/1999 | Gordin et al. |
| 6,082,787 A | 7/2000 | Chioffi et al. |
| 6,082,878 A | 7/2000 | Doubek et al. |
| 6,250,774 B1 | 6/2001 | Begemann et al. |
| 6,402,337 B1 | 6/2002 | LeVasseur et al. |
| 6,543,911 B1 | 4/2003 | Rizkin et al. |
| 6,679,621 B2 | 1/2004 | West et al. |
| 6,814,470 B2 | 11/2004 | Rizkin et al. |
| 6,899,443 B2 | 5/2005 | Rizkin et al. |
| 6,948,838 B2 | 9/2005 | Kunstler |
| 6,951,418 B2 | 10/2005 | Rizkin et al. |
| 6,953,264 B2 | 10/2005 | Ter-Hovhannisian |
| 7,004,603 B2 | 2/2006 | Knight |
| 7,012,604 B1 | 3/2006 | Christie et al. |
| 7,093,961 B2 | 8/2006 | Bentley et al. |
| 7,229,194 B2 | 6/2007 | Liu et al. |
| 7,385,360 B2 | 6/2008 | Bluzniak |
| 7,429,757 B2 | 9/2008 | Oyama et al. |
| 7,452,108 B2 | 11/2008 | Gordin et al. |
| 7,495,817 B2 | 2/2009 | Hunt |
| 7,503,669 B2 | 3/2009 | Rizkin et al. |
| 7,540,629 B2 | 6/2009 | Steinberg |
| 7,543,941 B2 | 6/2009 | Holder et al. |
| 7,548,376 B2 | 6/2009 | Kim et al. |
| 7,566,147 B2 | 7/2009 | Wilcox et al. |
| 7,588,345 B1 | 9/2009 | Davis et al. |
| 7,618,163 B2 | 11/2009 | Wilcox |
| 7,625,102 B2 | 12/2009 | Koike et al. |
| 7,625,104 B2 | 12/2009 | Zhang et al. |
| 7,637,630 B2 | 12/2009 | Wilcox et al. |
| 7,641,379 B2 | 1/2010 | Gisler |
| 7,654,705 B2 | 2/2010 | Czech et al. |
| 7,744,246 B2 | 6/2010 | Rizkin et al. |
| 7,766,509 B1 | 8/2010 | Laporte |
| 7,845,827 B2 | 12/2010 | Tarter et al. |
| 7,857,497 B2 | 12/2010 | Koike et al. |
| 7,959,326 B2 | 6/2011 | Laporte |
| 7,976,194 B2 | 7/2011 | Wilcox et al. |
| 7,976,199 B2 | 7/2011 | Berns et al. |
| 8,002,435 B2 | 8/2011 | Laporte |
| 8,007,131 B2 | 8/2011 | Liu et al. |
| 8,018,457 B2 | 9/2011 | Peterson et al. |
| 8,066,406 B2 | 11/2011 | Boyer et al. |
| 8,092,042 B2 | 1/2012 | Wilcox |
| 2002/0163001 A1 | 11/2002 | Shaddock |
| 2002/0198978 A1 | 12/2002 | Watkins |
| 2003/0156410 A1 | 8/2003 | Ter-Hovhannisian |
| 2003/0210555 A1 | 11/2003 | Cicero et al. |
| 2005/0068765 A1 | 3/2005 | Ertze Encinas et al. |
| 2006/0082989 A1 | 4/2006 | Wang |
| 2006/0139659 A1 | 6/2006 | Steinberg |
| 2006/0158887 A1 | 7/2006 | Holder et al. |
| 2006/0176708 A1 | 8/2006 | Gordin et al. |
| 2006/0181880 A1 | 8/2006 | Gordin et al. |
| 2006/0291218 A1 | 12/2006 | Pazula |
| 2007/0090362 A1 | 4/2007 | Ahn et al. |
| 2007/0091444 A1 | 4/2007 | Kim et al. |
| 2007/0201225 A1 | 8/2007 | Holder et al. |
| 2008/0037239 A1 | 2/2008 | Thomas et al. |
| 2008/0062689 A1 | 3/2008 | Villard |
| 2008/0101063 A1 | 5/2008 | Koike et al. |
| 2008/0191236 A1 | 8/2008 | DeGraaf et al. |
| 2008/0192480 A1 | 8/2008 | Rizkin et al. |
| 2008/0273333 A1 | 11/2008 | Berns et al. |
| 2008/0285273 A1 | 11/2008 | Liu et al. |
| 2009/0007978 A1 | 1/2009 | Alston et al. |
| 2009/0100702 A1 | 4/2009 | Fair |
| 2009/0103299 A1 | 4/2009 | Boyer et al. |
| 2009/0284966 A1 | 11/2009 | Crookham et al. |
| 2009/0310356 A1 | 12/2009 | Laporte |
| 2009/0322752 A1 | 12/2009 | Peterson et al. |
| 2009/0323330 A1 | 12/2009 | Gordin et al. |
| 2010/0002432 A1 | 1/2010 | Romano |
| 2010/0014290 A1 | 1/2010 | Wilcox |
| 2010/0103668 A1 | 4/2010 | Lueken et al. |
| 2010/0103672 A1 | 4/2010 | Thomas et al. |
| 2010/0157570 A1 | 6/2010 | Xiao et al. |
| 2010/0290225 A1 | 11/2010 | Rizkin et al. |
| 2010/0328931 A1 | 12/2010 | fogerlie |
| 2011/0083460 A1 | 4/2011 | Thomas et al. |

FOREIGN PATENT DOCUMENTS

| | | |
|---|---|---|
| CN | 101220928 A | 7/2008 |
| CN | 201396660 Y | 2/2010 |
| CN | 102132088 A | 7/2011 |
| DE | 20 2008 004790 U1 | 8/2008 |
| EP | 2 039 990 A1 | 3/2009 |
| EP | 2 039 990 B1 | 10/2010 |
| WO | WO 01/86198 A1 | 11/2001 |
| WO | WO 2005/059436 A1 | 6/2005 |
| WO | WO 2006/114726 A2 | 11/2006 |
| WO | WO 2007/044472 A2 | 4/2007 |
| WO | WO 2008/092271 A1 | 8/2008 |
| WO | WO 2008/106843 A1 | 9/2008 |
| WO | WO 2008/123960 A1 | 10/2008 |
| WO | WO 2009/149558 A1 | 12/2009 |
| WO | WO 2010/033545 A2 | 3/2010 |
| WO | WO 2010/033545 A3 | 3/2010 |
| WO | WO 2010/042186 A2 | 4/2010 |
| WO | WO 2010/042186 A3 | 4/2010 |
| WO | WO 2011/123142 A1 | 10/2011 |

OTHER PUBLICATIONS

CN 101169232—Stanley Electric—English Translation.
CN 102132088—Philips—English Translation.
Lindsey, Jack L., et al., "Calculating Illuminance at a Point", IESNA ED-150.5B, prepared for the Education Materials Committee, Illuminating Engineering Society of North America, 1993 (32 pages).
Philips-Lumec, Brochure—"LifeLED / Breathing life", Copyright 2008 (20 pages).
Musco Corporation, et al., PCT/US2012/025599—International Search Report mailed Dec. 3, 2012, 4 pages.

(56) References Cited

OTHER PUBLICATIONS

Philips Lumileds "Thermal Design Using LUXEON® Power Light Source" Application Brief AB05, Jun. 2006, 12 pages.

"Simple Guidelines for Lighting Regulations for Small Communities, Urban Neighborhood's and Subdivisions" [downloaded from http://www.darksky.org/mc/page.do?sitePageID=58881 on May 16, 2008], 3 pages, copyright 2008.

Musco Corporation, PCT/US2009/057090, International Search report and Written Opinion of International Searching Authority, mailed May 10, 2010, and International Preliminary Report on Patentability dated Jan. 25, 2011.

Musco Corporation, PCT/US2010/034530, International Search report and Written Opinion of International Searching Authority, mailed Apr. 22, 2011, (6 pages).

CN 101220928 A—Shi, Jie—English Abstract.

Musco Corporation et al.,—Annex to the European Search Report on European Patent Application No. EP 09 81 5084 and Supplementary European Search Report, dated Jan. 30, 2012, (5 pages).

Cree, "Cree® XLamp® XP-E LEDs" Product Family Data Sheet, CLD-DS18 Rev. 12, 2008-2010, 16 pages.

Cree, "Cree® XLamp® XR-E and XR-C LED" Binning & Labeling, CLD AP12, Rev. 8, 2004-2010, 15 pages.

Color Gel, http://en.wikipedia.org/wiki/color_gel, Mar. 8, 2009, pp. 74-76.

Illuminating Engineering Society of North America (IESNA), IESNA Lighting Education, Fundamental Level, IESNA ED-100, TM-11-00, 3 pages.

IESNA, Light & Color, IESNA ED-100.1, 2 pages, brochure.

Leadford, Kevin F. "Illuminance Calculations—The Lumen Method", IESNA ED-150.5A, 1993, 72 pages.

Luminit Shaping Light As Needed, "Architectural/Event Lighting Diffusers", pp. 77-78, www.luminitco.com.

"MIRO", Anomet 2006 Brochure, 2 pages.

Paulin, Douglas, "Full Cutoff Lighting: The Benefits", IESNA LD+A/Apr. 2001, pp. 54-56.

Philips, Lumileds "Thermal Design Using LUXEON® Power Light Sources", Application Brief ABO5 Jun. 2006, 12 pages.

Philips, "power light source LUXEON® Emitter", Technical Datasheet DS25, May 2007, 19 pages.

Benthin, Carsten, et al., Interactive Headlight Simulation—A Case Study of Interactive Distributed Ray Tracing—, Computer Graphics Group, Saarland University, Technical Report TR-2002-03 (2002) (6 pages).

BetaLED , a Division of RUUD Lighting, Brochure—"uncompromisingBrilliance", www.betaLED.com/spec-sheets.aspx, 2009 (24 pages).

"6.7 Bessel Functions of Fractional Order, Airy Functions, Spherical Bessel Functions", Sample page from Numerical Recipes in Fortran &&: The Art of Scientific Computing (ISBN 0-521-43064-X), pp. 234-245, Copyright 1986-1992 (12 pages).

Cree, Brochure—"Cree XLamp XP-G LEDs—Product Family Data Sheet", CLD-DS20 Rev. 5, pp. 1-12, Copyright 2009-2011 Cree, Inc. (12 pages).

Jin, Xiaogang, et al., "Analytical methods for polynomial weighted convolution surfaces with various kernels", Pergamon, Computers & Graphics 26 (2002) pp. 437-447 (11 pages).

Lumec, A Lumec White Paper—"LEDs for outdoor lighting applications" (date unknown) (11 pages).

Philips-Lumec, Brochure—"LEONIS—Landmark of a new world" (date unknown) (24 pages).

Vose, Michael D., Excerpt from book entitled: "The Simple Genetic Algorithm—Foundations and Theory", The MIT Press, 1999 (139 pages).

Whitley, Darrell, "A Genetic Algorithm Tutorial" Colorado State University, Fort Collins, Colorado (date unknown) (37 pages).

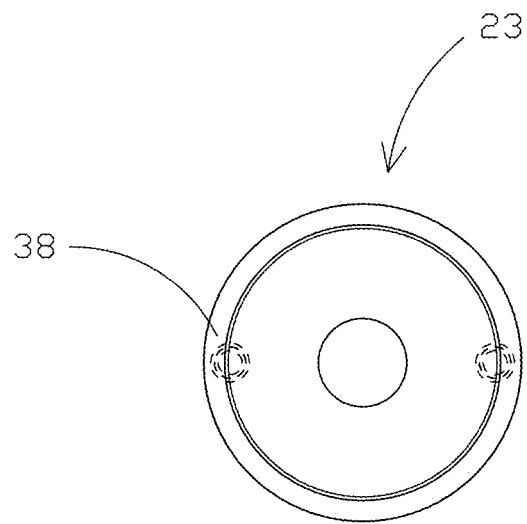
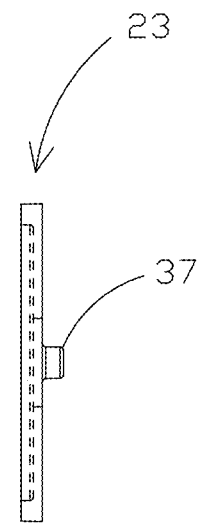
FIG 4C  FIG 4D
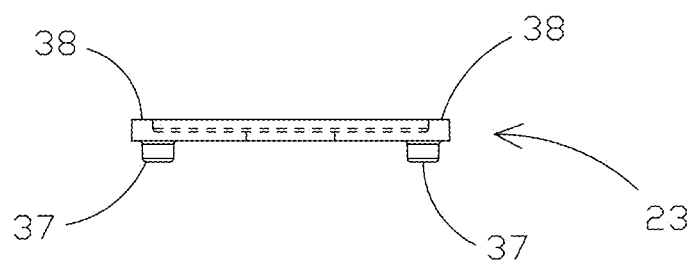
FIG 4B
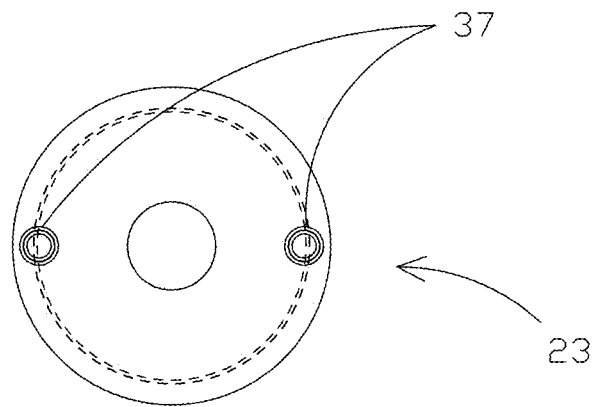
FIG 4A

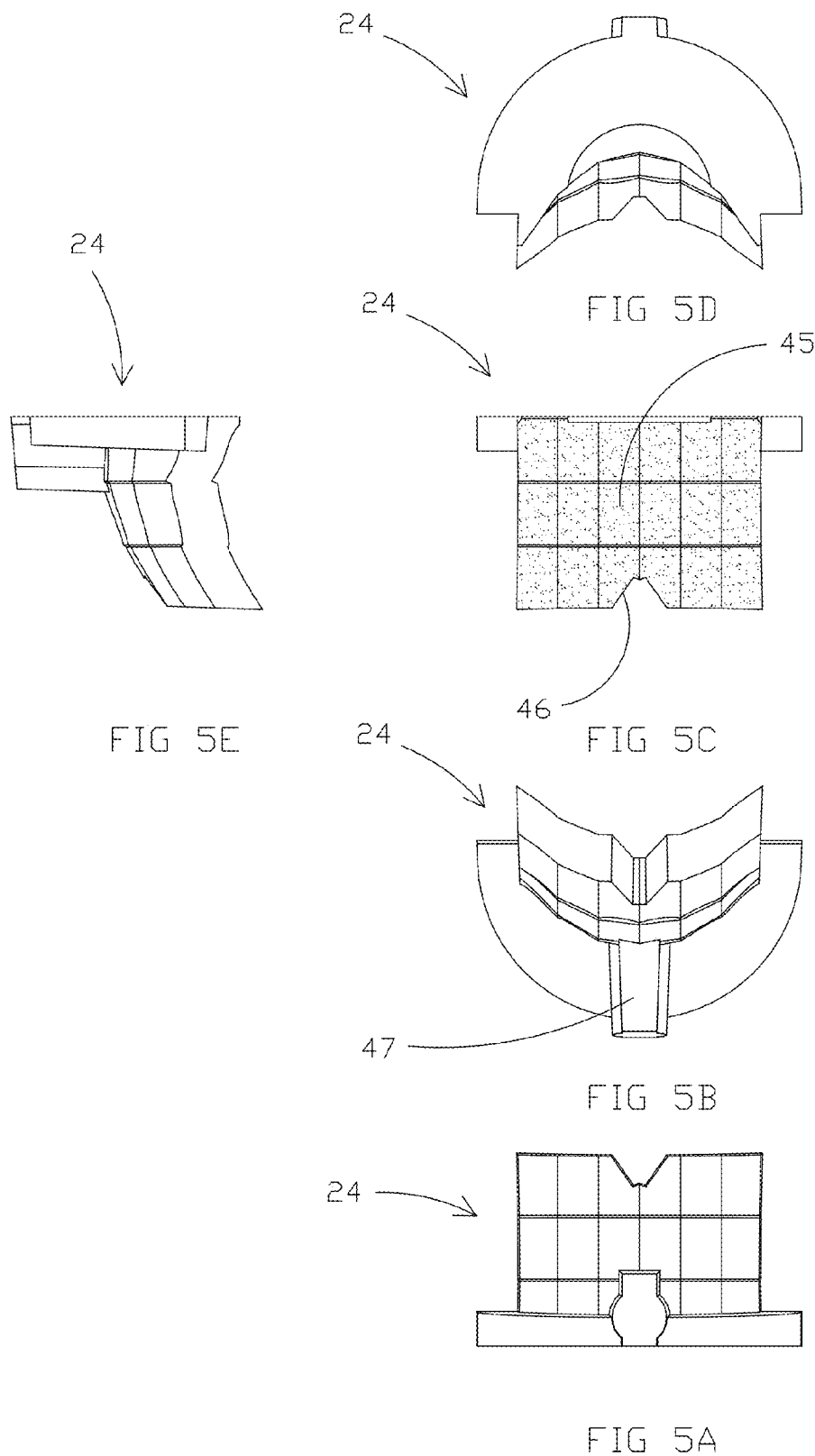

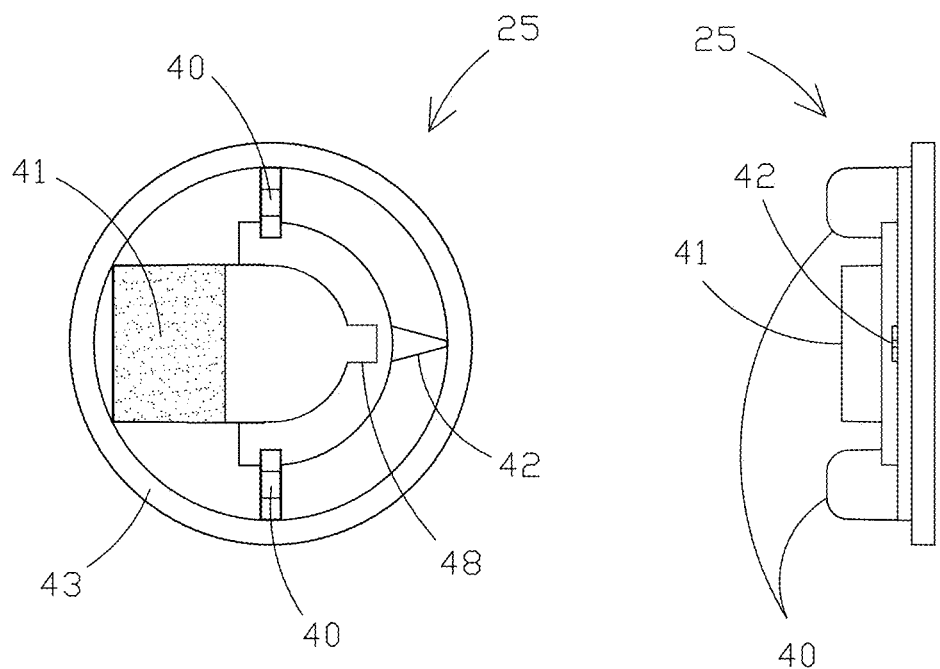
FIG 6C
FIG 6D
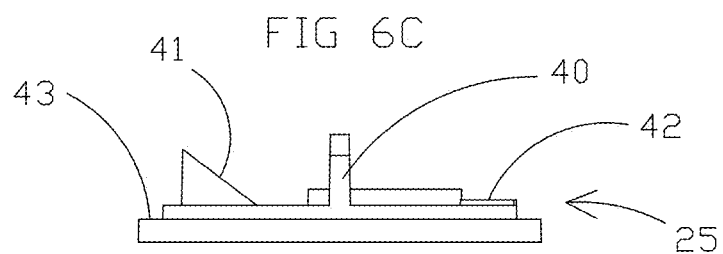
FIG 6B
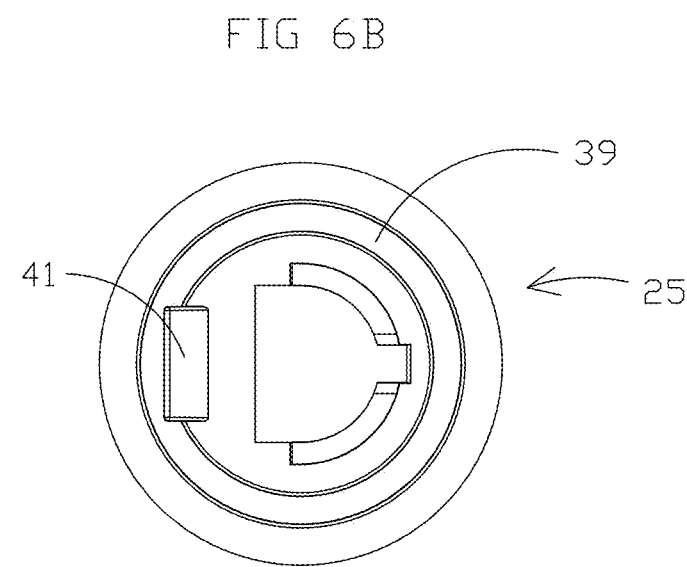
FIG 6A

APPARATUS, METHOD, AND SYSTEM FOR HIGHLY CONTROLLED LIGHT DISTRIBUTION USING MULTIPLE LIGHT SOURCES

CROSS-REFERENCE TO RELATED APPLICATIONS

This application is a continuation of U.S. Ser. No. 12/751,519 filed Mar. 31, 2010, now U.S. Pat. No. 8,449,144 issued May 28, 2013, which is a continuation-in-part of co-pending PCT application No. PCT/US09/57090 filed Sep. 16, 2009, and U.S. Ser. No. 12/467,160 filed May 15, 2009, now U.S. Pat. No. 8,356,916 issued Jan. 22, 2013 both of which claim priority to provisional U.S. Ser. No. 61/097,483 filed Sep. 16, 2008, which are hereby incorporated by reference in their entireties, and U.S. Ser. No. 12/467,160 filed May 15, 2009, now U.S. Pat. No. 8,356,916 issued Jan. 22, 2013, claims the benefit of U.S. Ser. No. 61/097,483 filed Sep. 16, 2008 and U.S. Ser. No. 61/054,089 filed May 16, 2008.

BACKGROUND OF THE INVENTION

The present invention generally relates to systems and methods for lighting. More specifically, the present invention relates to an adjustable lighting fixture utilizing light emitting diodes (LEDs) to produce highly controlled and highly customized lighting.

In the current state of the art, the light projected from a fixture is often characterized in terms of the pattern of light as viewed on a target area; this is often referred to as the beam distribution type, beam type, or beam pattern. Beam distribution types are well known in the state of the art and are well defined and standardized by various organizations (e.g., the Illuminating Engineering Society (IES)).

Various light source types (e.g., HID, LED) can produce a given beam type via use of optical elements (e.g., reflective or refractive lenses). With LEDs, for example, a fixture may comprise a plurality of LED light sources, each light source coupled with an optic such that the composite beam (i.e., the collective of each beam projected from each LED) is of a particular beam distribution type. One example of this in the current state of the art are THE EDGE™ fixtures—available from Beta Lighting Inc., Sturtevant, Wis., U.S.—which use an array of identical NANOOPTICT™ refractors to produce a specific beam distribution type.

One disadvantage to such current art approaches is that the designed optics are only useful in producing a single beam type; they must be modified or replaced if a different beam type is desired. In the case of LEDs, this can require the modification or replacement of dozens of optics. Additionally, such fixtures afford little flexibility; a type II beam pattern (as defined by IES) may be sufficient to illuminate a target area but if the target area changes (e.g., the area to be illuminated is increased, the target area is moved), or the lighting needs change (e.g., spill light needs to be eliminated, glare needs to be controlled), the beam type may no longer be appropriate for the application. Of course, the fixture itself may be adjusted about a particular axis to positionally shift the projected light, but this will not significantly change the beam type.

The current state of the art may benefit from improved design of lighting fixtures such that projected light from said fixtures may be customized to produce beam patterns beyond those which are well defined and standardized in the industry. Further, the art may benefit if the components of lighting fixtures may be made modular such that components may be switched in and out onsite to facilitate fast, easy, and cost-effective customization of a projected beam type. Thus, there is room for improvement in the art.

I. SUMMARY OF THE INVENTION

Envisioned are apparatus, method, and system for lighting fixtures which comprise adjustable components to facilitate customization in lighting a target area in a manner that allows greater control over light distribution and light intensity than in some fixtures in the current state of the art. Embodiments of the present invention are described with reference to LEDs and LED lighting, however, embodiments of the present invention are equally applicable to other solid state light sources, other lighting devices (e.g., lasers), or other fixtures that allow for multiple light sources to be packaged together in a small area.

It is therefore a principle object, feature, advantage, or aspect of the present invention to improve over the state of the art and/or solve problems and deficiencies in the state of the art.

Further objects, features, advantages, or aspects of the present invention may include one or more of the following:
a. producing a composite beam which may include standard beam distribution types and/or customized beam types;
b. producing a composite beam from a plurality of individual beams, each individual beam being produced from a selection of a relatively small number of fixture components;
c. locating fixture components relative to the light source in a manner that maintains tight control over light distribution; and
d. developing a fixture in which fixture components may be aimed prior to installation but may also be aimed, adjusted, or switched with other fixture components onsite after installation.

One aspect of the invention comprises an apparatus including a plurality of solid state light sources, positioning rings, and optical components.

Another aspect of the invention comprises a method of designing an optic system including one or more of: (a) a light distributing member and (b) a light blocking member.

Another aspect according to the invention is illustrated in FIG. 1A in which a composite beam 200, which may be produced by the apparatus or method described above, is formed from individual light beams 210 from a single fixture 10; note only a few light beams 210 are illustrated in FIG. 1A and are not representative of the number of light beams produced from fixture 10. Alternatively, as illustrated in FIG. 1B, a composite beam 220 may be formed from individual light beams 210 from multiple fixtures 10 which may be affixed to a single pole 11; again, for purposes of demonstration and brevity, only a few beams 210 are illustrated.

These and other objects, features, advantages, or aspects of the present invention will become more apparent with reference to the accompanying specification.

II. BRIEF DESCRIPTION OF THE DRAWINGS

From time-to-time in this description reference will be taken to the drawings which are identified by figure number and are summarized below.

FIGS. 4A-D illustrate various views of the locating ring according to at least one aspect of the present invention.

FIGS. 5A-E illustrate various views of the reflector according to at least one aspect of the present invention.

FIGS. 6A-D illustrates various views of the visor base according to at least one aspect of the present invention.

Figure 7:
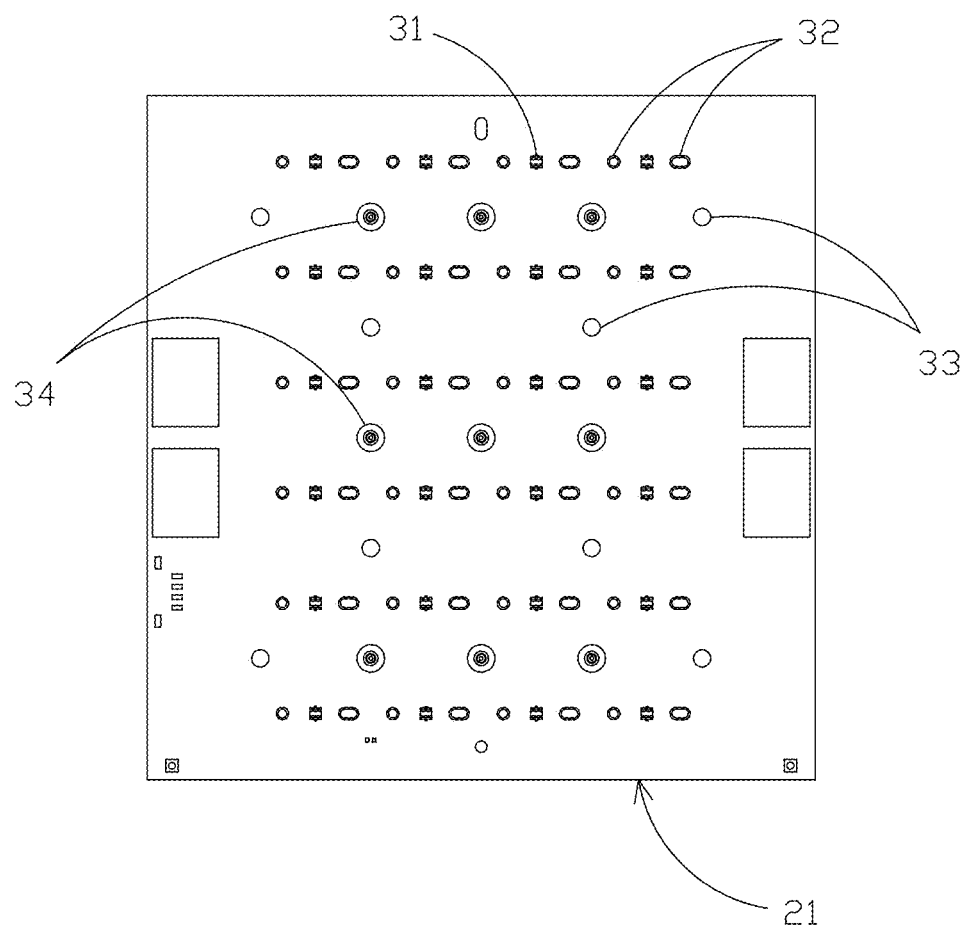

FIG. 7 illustrates a top view (with respect to FIG. 3A) of the circuit board according to at least one aspect of the present invention.

Figure 8:
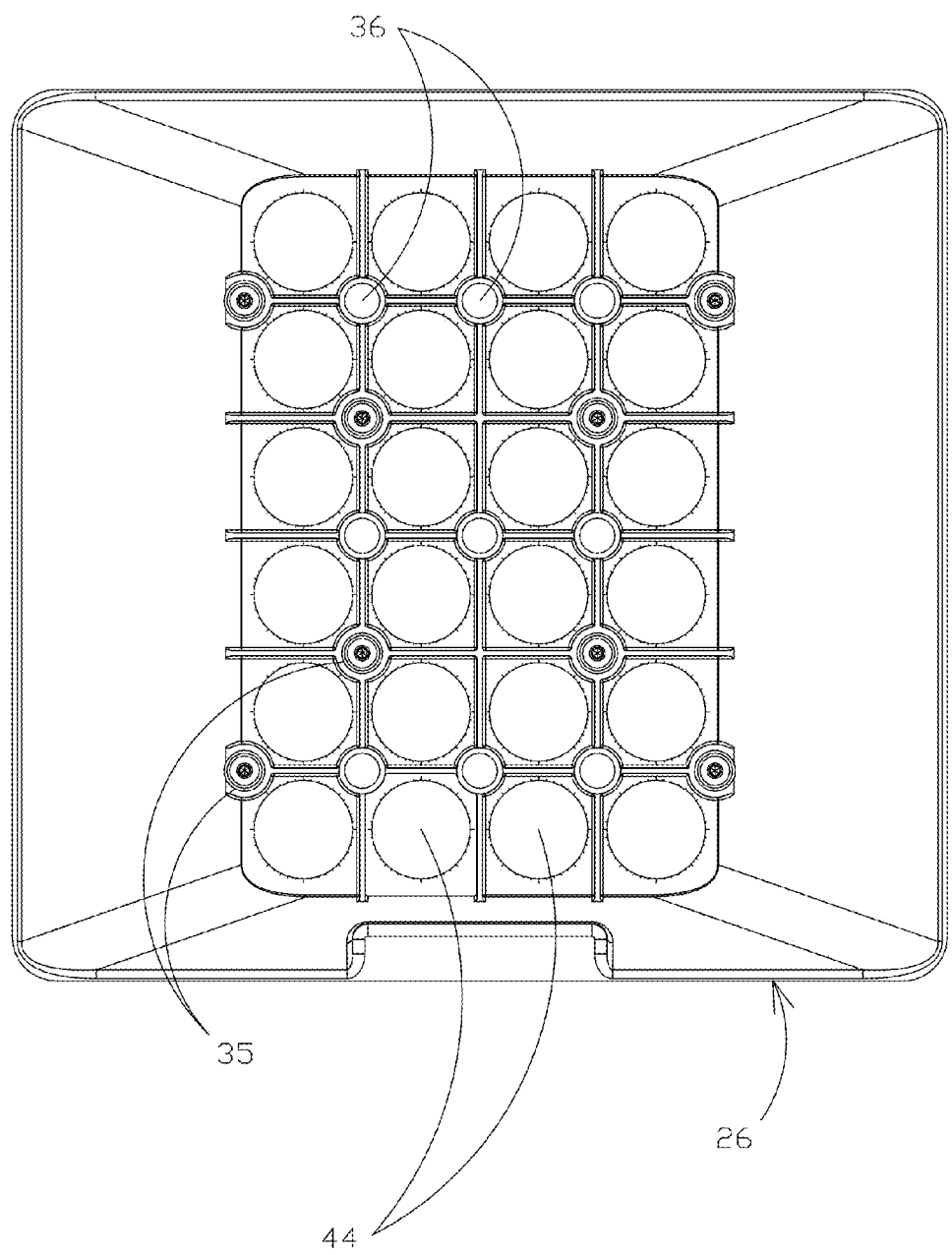

FIG. 8 illustrates a top view (with respect to FIG. 3A) of the retaining plate according to at least one aspect of the present invention.

Figure 9A:
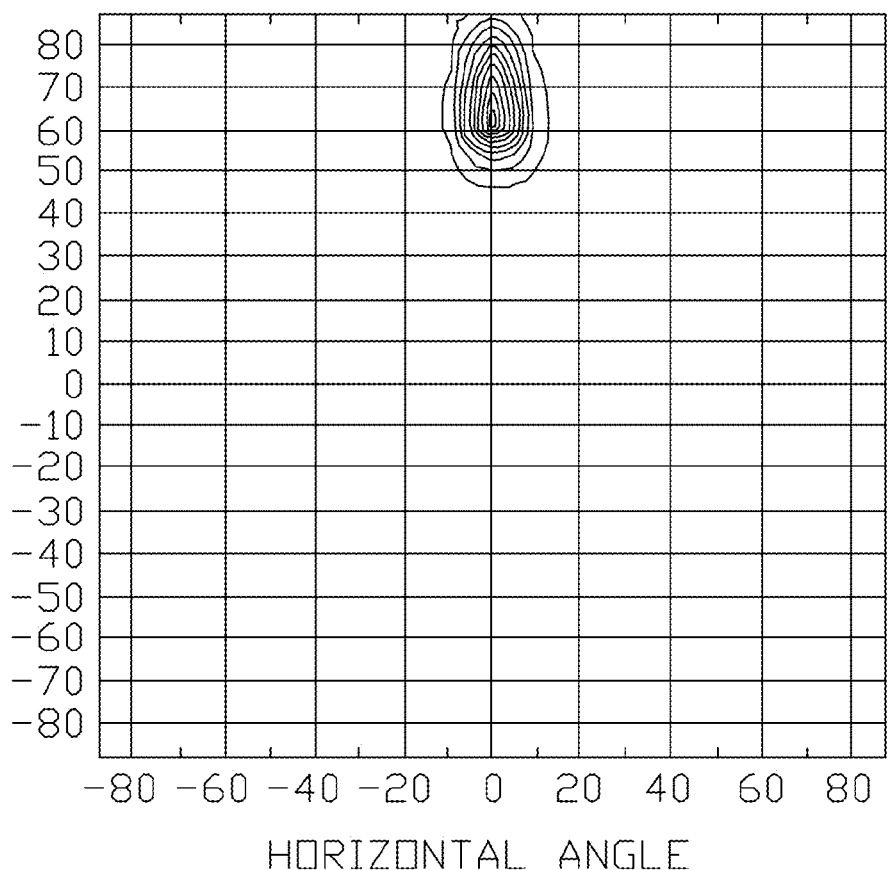
Figure 9B:
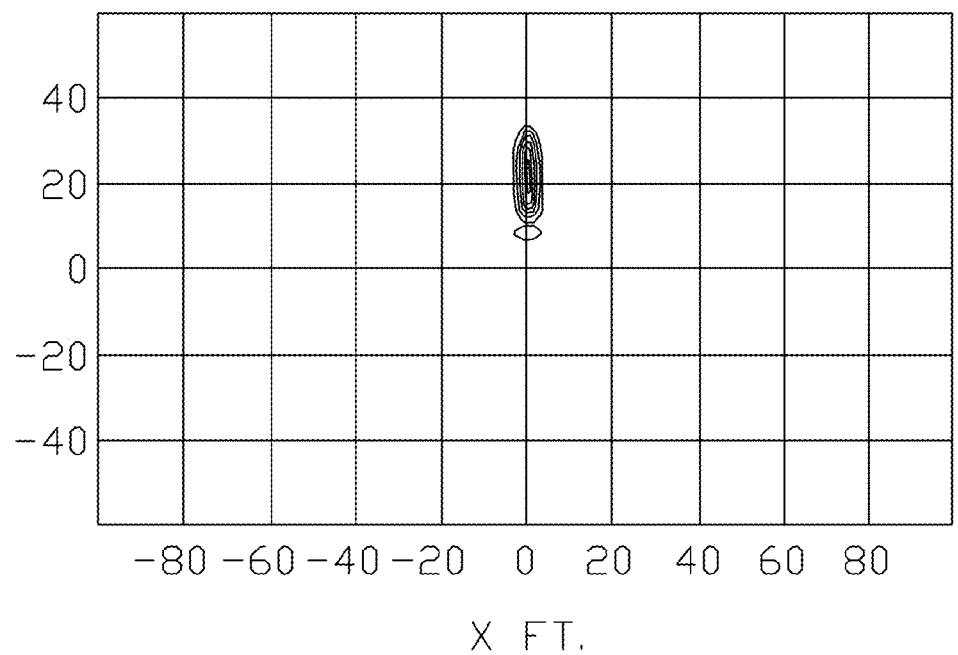

FIGS. 9A and 9B illustrate photometric data for an LED with a standard parabolic reflector. FIG. 9A illustrates an isocandela diagram and FIG. 9B illustrates a footcandle diagram.

Figure 9C:
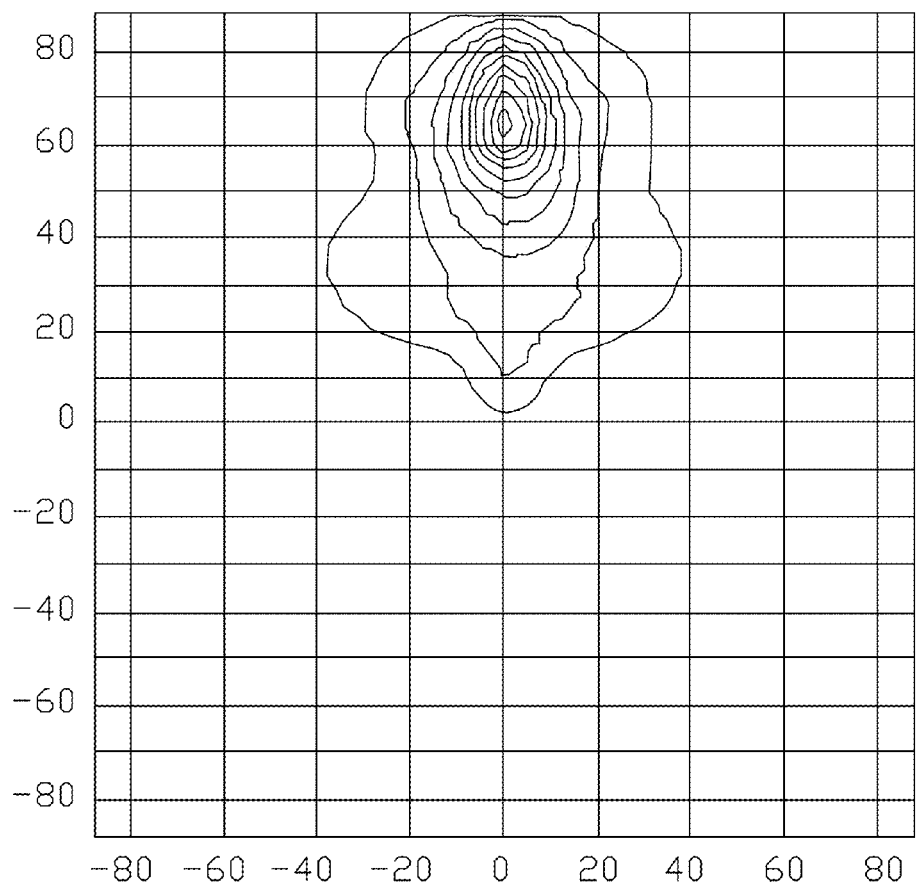
Figure 9D:
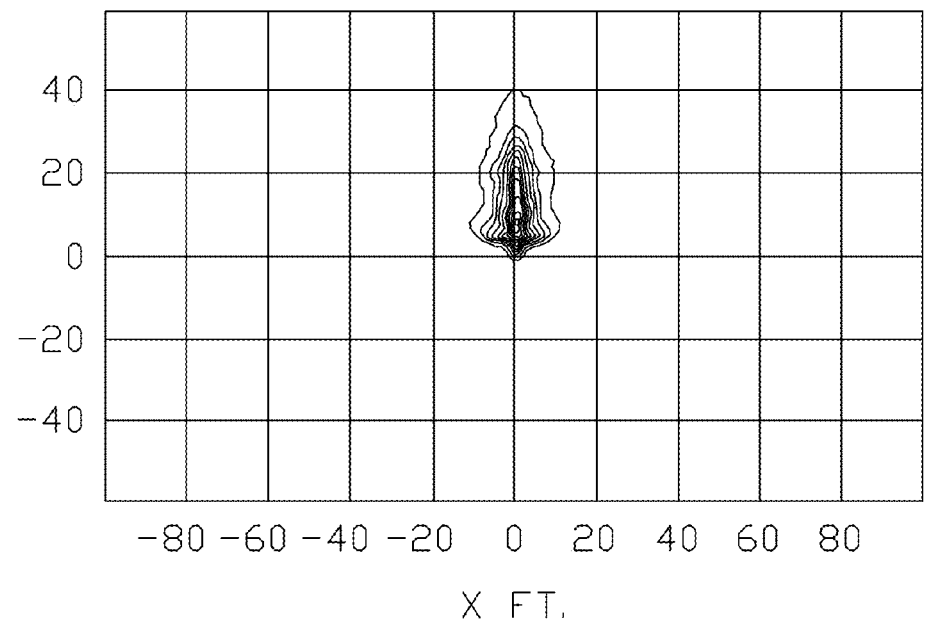

FIGS. 9C and 9D illustrate photometric data for an LED with a modified reflector. FIG. 9C illustrates an isocandela diagram and FIG. 9D illustrates a footcandle diagram.

Figure 9E:
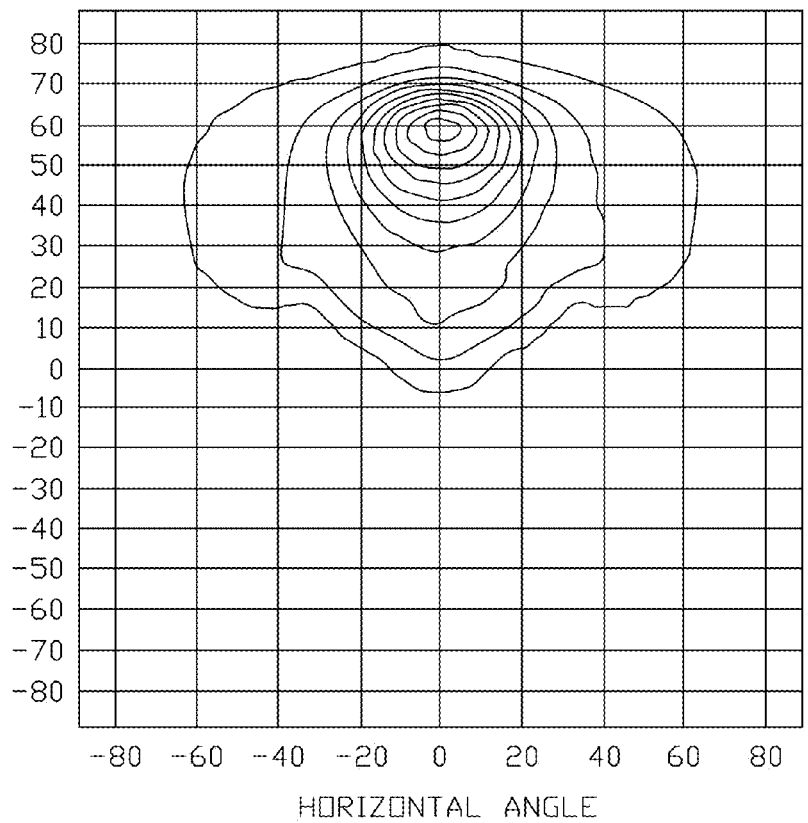
Figure 9F:
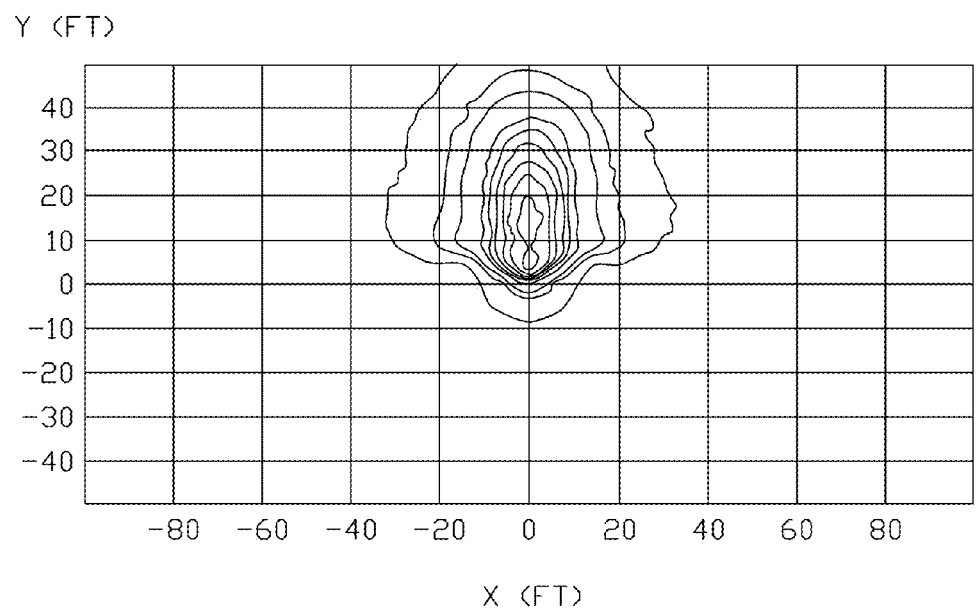

FIGS. 9E and 9F illustrate photometric data for an LED with an alternative modified reflector. FIG. 9E illustrates an isocandela diagram and FIG. 9F illustrates a footcandle diagram.

III. DETAILED DESCRIPTION OF EXEMPLARY EMBODIMENTS

A. Overview

To further understanding of the present invention, a specific exemplary embodiment according to the present invention will be described in detail. Frequent mention will be made in this description to the drawings. Reference numbers will be used to indicate certain parts in the drawings. The same reference numbers will be used to indicate the same parts throughout the drawings.

Aspects according to the present invention provide for a lighting fixture—using LEDs or other solid state light sources—which projects a composite beam that is customizable and adjustable; customizable in that a desired beam distribution pattern (which may or may not be a standard beam pattern per the lighting industry) may be effectuated from a relatively small number of fixture components, and adjustable in that components may be traded out onsite if lighting effect changes (e.g., glare control, spill light control) are desirable.

Figure 1A:
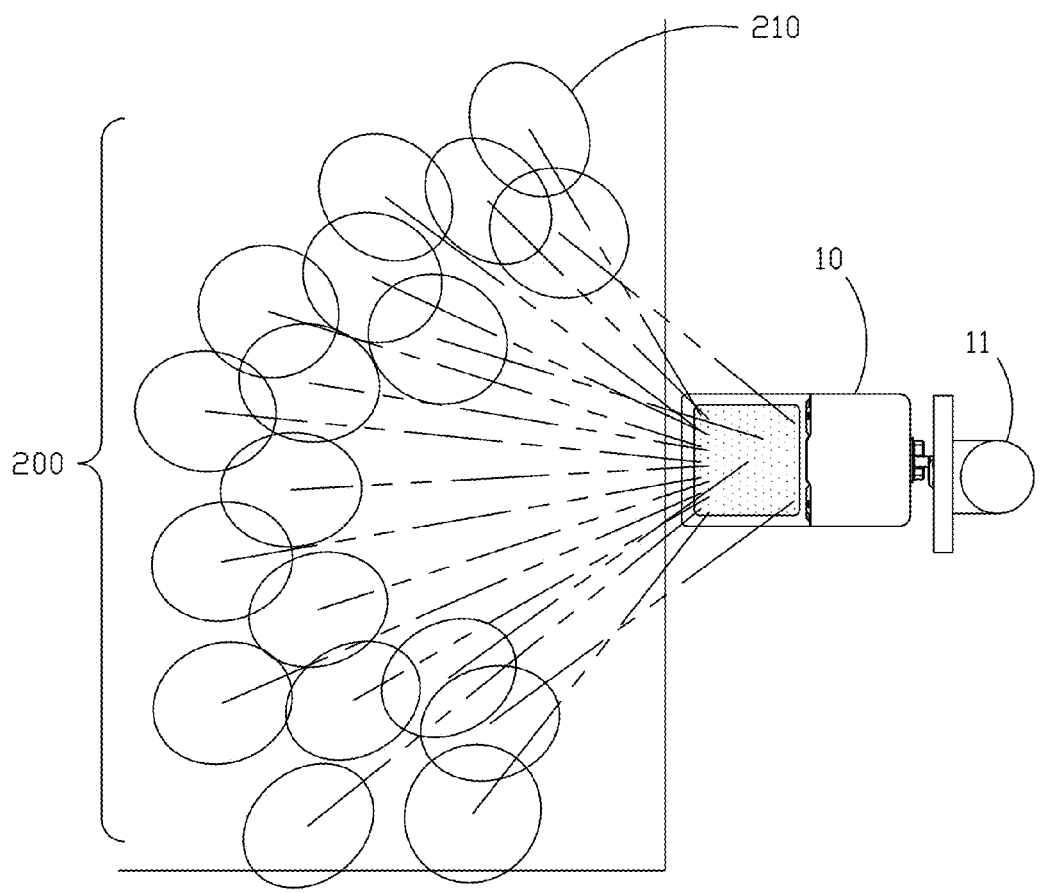
FIGS. 1A and 1B illustrate the creation of a composite beam from a plurality of individual beams according to one aspect of the present invention.
Figure 1B:
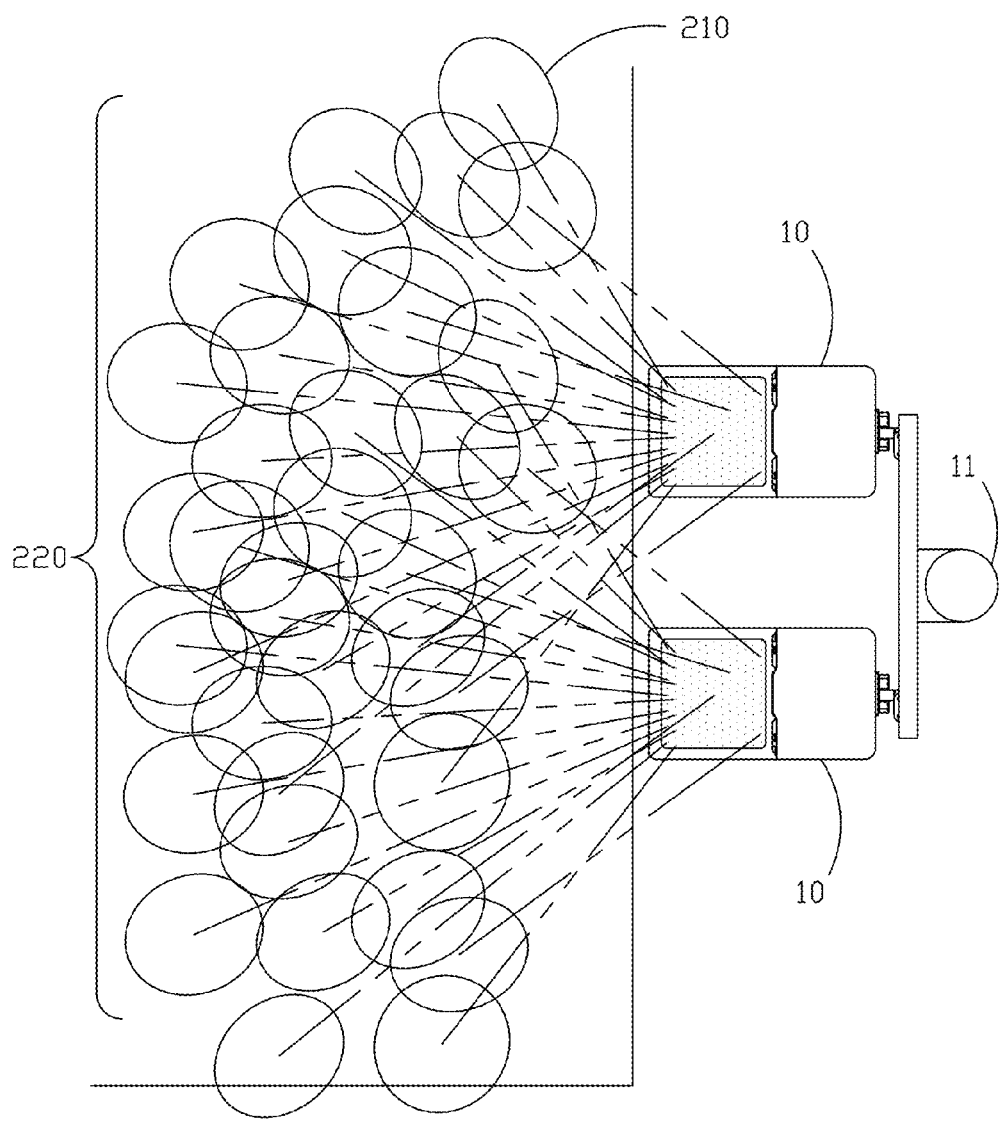

As has been stated, the projected composite beam may be comprised of light emitted from a plurality of light sources in a single fixture (see FIG. 1A) or a plurality of fixtures (see FIG. 1B); likewise, the composite beam may include light projected from multiple light sources that are housed on multiple poles (see reference no. 11). It is of further note, that as described in aforementioned PCT application No. PCT/US09/57090, U.S. application Ser. No. 12/467,160, and U.S. provisional application No. 61/097,483, the composite beam may comprise overlapped individual beams similar in shape (e.g., to obtain a desired illumination), overlapped or juxtaposed individual beams different in shape (e.g., to obtain a desired beam shape), or some combination thereof to address lighting needs. In essence, the composite beam may comprise any number of individual beams each of which may be adjustable in terms of shape, size, intensity, aiming and/or orientation relative to the fixture, or otherwise. Specific methods of designing such composite beams are discussed in the aforementioned parent patent applications, which are incorporated by reference in their entirety.

B. Exemplary Method and Apparatus Embodiment 1

Figure 2:
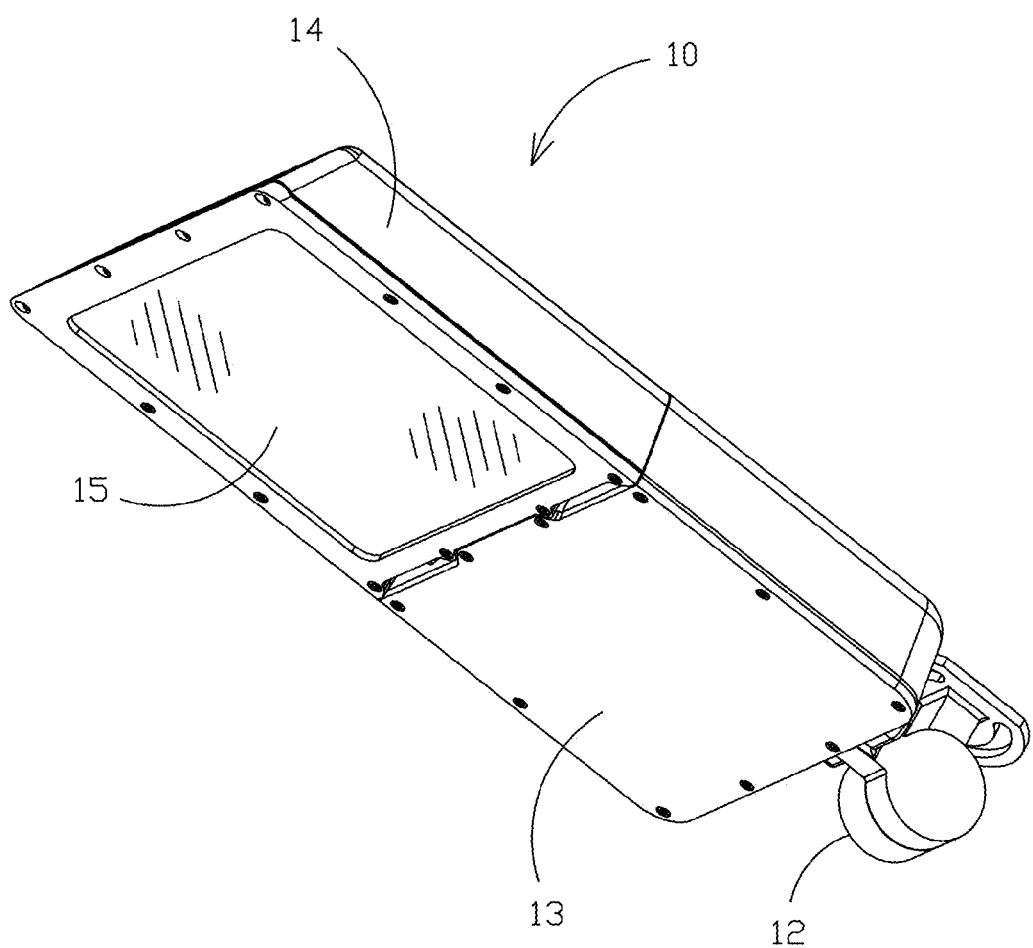
FIG. 2 illustrates one possible lighting fixture according to at least one aspect of the present invention.

A more specific exemplary embodiment, utilizing aspects of the generalized example described above, will now be described. FIG. 2 illustrates one possible lighting fixture 10 which houses multiple LEDs and comprises an aluminum housing 14, a removable panel 13 for access to the power regulating devices associated with the LEDs (which are well known in the art of lighting), a removable lens 15 for access to the LEDs and associated optics, and an adjustable mounting knuckle 12 for mounting lighting fixture 10 to a pole 11 or other structure. As described in the incorporated-by-reference parent patent applications, lens 15 may further comprise an anti-reflective coating which, as is well known in the art of lighting, may allow for a variety of angles of incidence up from normal.

Figure 3A:
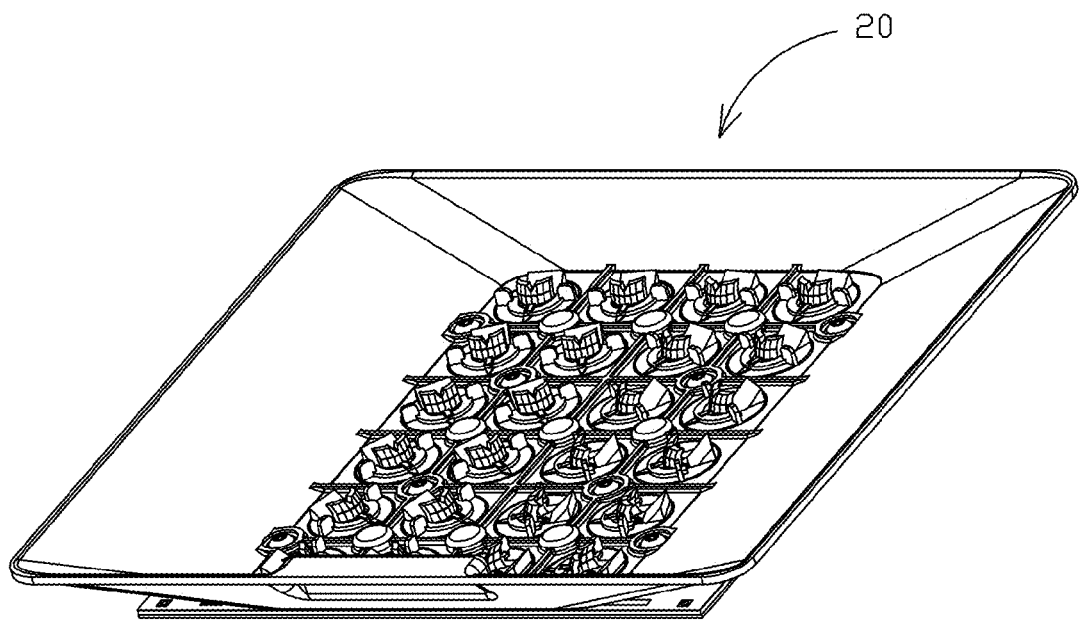
FIG. 3A illustrates a perspective view of a subassembly which is housed in the lighting fixture of FIG. 2.
Figure 3B:
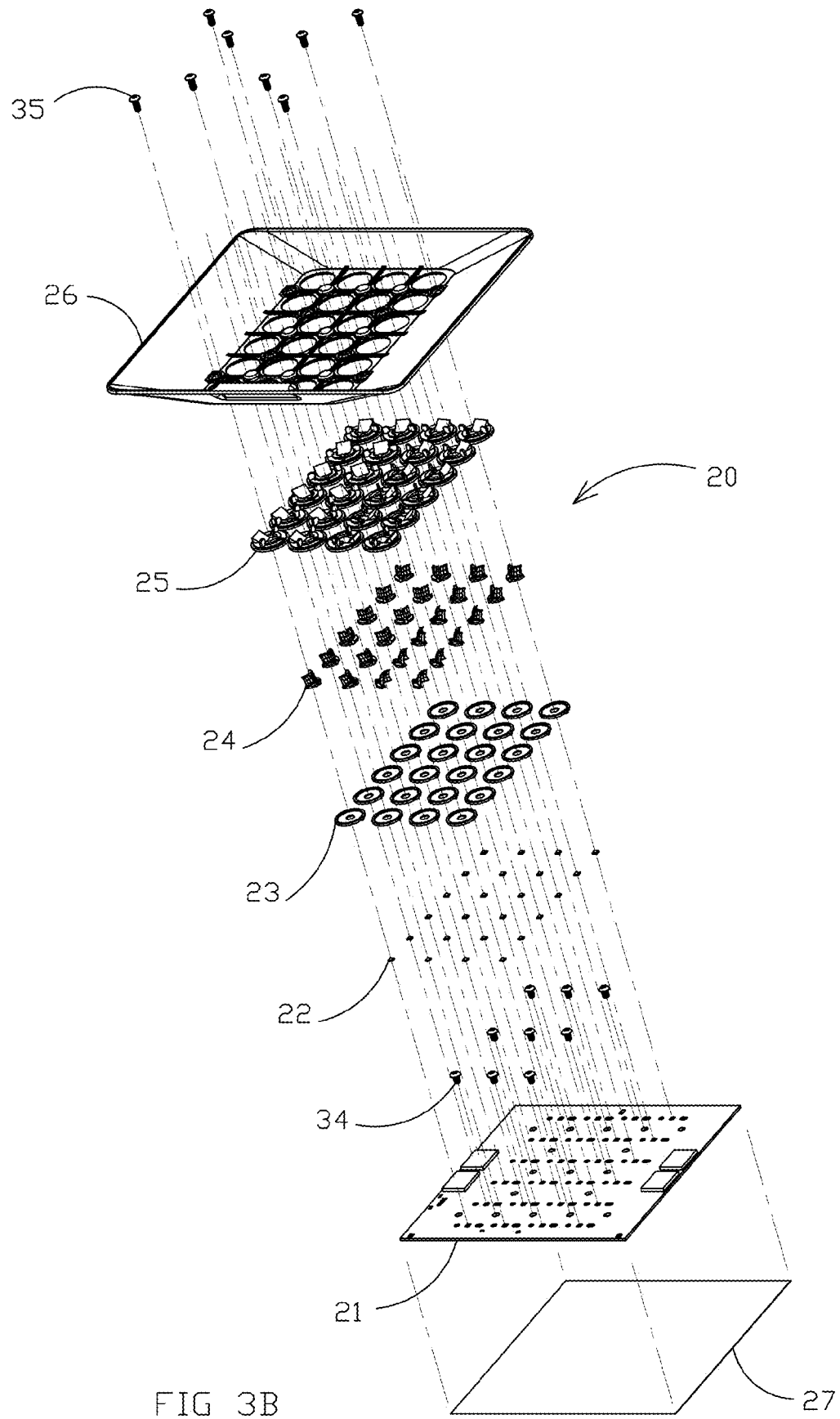
FIG. 3B illustrates, in exploded form, the components of the subassembly of FIG. 3A.
Figure 3C:
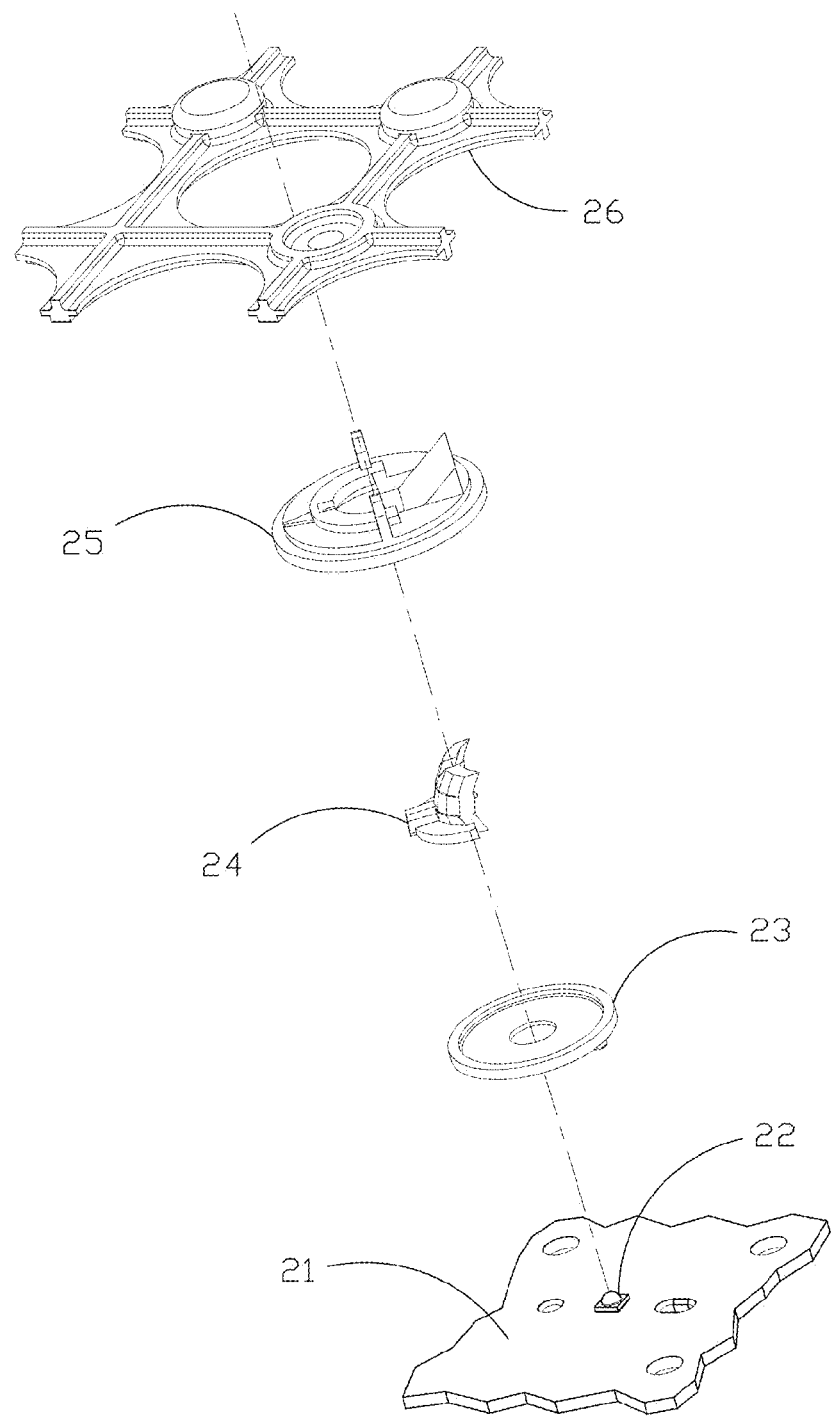
FIG. 3C illustrates, in exploded perspective view, details of some of the components of the subassembly of FIG. 3A.

FIGS. 3A-C illustrate a subassembly 20 housed in fixture 10 which comprises a thermal interface layer 27, LED circuit board 21, LEDs 22, locating ring 23, reflector 24, visor base 25, and retaining plate 26. As illustrated, subassembly 20 houses twenty-four LEDs with assorted components; however this is by way of example and not by way of limitation.

Thermal interface layer 27 may be of any available type; the primary purpose of layer 27 is to fill the space between circuit board 21 and housing 14 to facilitate heat dissipation; housing 14 acts as a heat sink for LEDs 22. LEDs 22 can be model XP-G available from Cree, Inc., Durham, N.C., USA, though this is by way of example and not by way of limitation.

A detailed view of circuit board 21 is illustrated in FIG. 7. As can be seen, LED board 21 comprises positioning points 31 for LEDs 22 and a pair of apertures 32 for positioning locating rings 23 about position points 31 (and, therefore, LEDs 22). With further respect to FIG. 7, LED circuit board 21 comprises bolts 34 (or analogous components) which affix board to housing 14. Apertures 33 are adapted to receive bolts (or analogous components) extending through retaining plate 26, which is illustrated in FIG. 8. As can be seen from FIG. 8, formed portions 36 of retaining plate 26 are shaped to accommodate the bolt heads of bolts 34 in circuit board 21. Bolts 35 through retaining plate 26 extend through apertures 33 and affix retaining plate 26 and circuit board 21 to housing 14.

FIGS. 4A-D illustrate locating ring 23 in more detail; as can be seen, pegs 37 are adapted to fit in apertures 32 of LED circuit board 21. Ridge 38 of locating ring 23 is adapted to fit in channel 39 of visor base 25 (see FIG. 6A). When ridge 38 is seated in channel 39, reflector 24 is positionally affixed in visor base 25 and pivotable relative to LED 22 (see FIGS. 3B and 3C). The use of locating ring 23 is an improvement over the current state of the art because it helps to maintain alignment of reflector 24 relative to LEDs 22 which, according to one estimate, is required to be on the order of ±0.02" to maintain adequate control of light distribution. For example, according to one method in the current state of the art a large plate with pre-punched apertures is laid over optical elements (similar to reflector 24) so to both align and positionally affix said optical elements. While functional, such plates must maintain tolerancing relative to each LED across the length of the entire part, which may be on the order of one foot or more. Alternatively, locating ring 23 is on the order of one inch in diameter and since there is a locating ring associated with each LED 22, strict tolerancing for each LED is more readily attained.

With regards to FIGS. 6A-D, visor base 25 further comprises grip tabs 40, visor 41, alignment marker 42, and ridge 43. As envisioned, visor base 25 is of polymeric composition with visor 41 metallized to act as a reflecting surface for light emitted from LED 22. Visor base 25 is adapted such that ridge 43 is compressed under retaining plate 26 with grip tabs 40, visor 41, and alignment marker 42 projecting through aperture 44 of plate 26; see FIG. 3A. As envisioned, visor 41 projects 37° upward from horizontal (i.e., the plane of retaining plate 26), though other angles, sizes, and shapes of visor 41 are possible and envisioned.

FIGS. 5A-E illustrate reflector 24 in more detail; as can be seen, reflector includes facets 45 which are metallized on the inner surface to aid in reflecting and a notch 46 to provide downward lighting. Tab 47 of reflector 24 is adapted to fit in notch 48 of visor base 25 such that, when ridge 38 of locating ring 23 is seated in channel 39 of visor base 25, metallized surfaces on visor 41 and reflector 24 are facing each other, are fixed relative to each other, surround LED 22, and may pivot 360° about LED 22. As envisioned, reflector 24 is a modified parabolic design produced by methods described in the incorporated-by-reference parent patent applications; however, this is by way of example and not by way of limitation. Other reflector designs are possible, and envisioned. For example, a reflector designed to allow for downlighting may be used in some subassemblies 20 of fixture 10 while other subassemblies 20 in the same fixture 10 use reflector 24; this combination of reflector designs allows adjustability of any portion or all of the composite beam in both the horizontal and vertical axes.

However, the design of reflector 24 offers some benefits over previous designs; namely, the ability to create a larger, more even beam pattern that is better suited to overlapping to build a composite beam. For example, FIGS. 9A and B illustrate isocandela and footcandle diagrams, respectively, for a standard parabolic reflector 10' above the target area using a Cree XR-E LED; it of note that aiming is 70° to nadir to allow for a more direct comparison to FIGS. 9C-F. FIGS. 9C and 9D illustrate isocandela and footcandle diagrams, respectively, for the modified parabolic reflector disclosed in the parent patent applications 10' above the target area using a Cree XR-E LED. FIGS. 9E and 9F illustrate isocandela and footcandle diagrams, respectively, for reflector 24 at 10' above the target area using a Cree XP-G LED. Comparing diagrams for the three reflector designs illustrates the progression from a spot-type beam where light transitions abruptly from intense light to no light, to a spread-type beam where projected light transitions gradually across the enlarged lighted area.

According to one possible method, a lighting designer or other person(s) determines the lighting needs (e.g., size, desired illumination level) of a particular area and determines which fixture components are suitable for the application (e.g., different shapes of reflector 24 may be available, different color or size of LEDs 22 may be available). Circuit board 21 is secured to housing 14 via bolts 34, thermal interface layer 27 filling the space between the bottom of circuit board 21 and the inner surface of housing 14. LEDs 22 are then placed at positioning points 31 on the secured board and the necessary electrical connections made. Locating rings 23 are then placed about LEDs 22 by placing pegs 37 of rings 23 in apertures 32 of secured circuit board 21. Reflectors 24 are placed in the center aperture of visor bases 25 by securing tabs 47 of reflectors 24 in cutouts 48 of visor bases 25. Reflector/ visor bases 24/25 are then placed on locating rings 23 by securing ridges 38 of locating rings 23 in channels 39 of visor bases 25.

Optical elements are placed in their correct orientation by pivoting visor base/reflector 25/24 about LEDs 22 by grip tabs 40; grip tabs 40 are beneficial to the design because they allow one to pivot visor base/reflector 25/24 about LEDs 22 without touching (and possibly diminishing the effectiveness of) metallized surfaces or damaging parts. Initial orientation of fixture components may be determined according to methods described in the incorporated-by-reference parent patent applications or otherwise.

Once all optical elements are oriented, indexed, or otherwise aimed, retaining plate 26 is lowered into housing 14, centered about optical elements, and bolts 35 are tightened (as stated, bolts 35 pass through apertures 33 in secured circuit board 21 before being secured to housing 14, helping to ensure alignment of the fixture components relative to each other and relative to housing 14). Remaining electrical connections are made, lens 15 is affixed to fixture 10, fixture 10 is mounted to pole 11 and powered, and fixture 10 is aligned via mounting knuckle 12. If at some point lighting needs change, fixture components fail or become damaged, or otherwise, aiming of fixture components may be changed by loosening bolts 35 and pivoting visor bases/reflectors 25/24 via grip tabs 40; alternatively or in addition, visor bases 25 and/or reflectors 24 may be switched out. If optical elements are realigned, the change can be quantified by the change in position of alignment marker 42 of visor base 25 relative to degree markings on plate 26 (see FIG. 8).

C. Options and Alternatives

The invention may take many forms and embodiments. The foregoing examples are but a few of those. To give some sense of some options and alternatives, a few examples are given below.

It is of note that LEDs 22 may differ from those described herein in a number of ways and not depart from at least some aspects of the present invention. For example, other models of LEDs, or other solid state sources, may be used. As another example, subassembly 20 may include more or fewer LEDs than illustrated. As another example, LEDs 22 may be placed in an offset pattern on circuit board 21. As another example, colored LEDs may be used. Likewise, reflector 24 and visor 41 may differ from those described herein. For example, reflector 24 may be larger or smaller or may have notch 46 omitted from the design; as has been stated, a combination of reflector designs may be used in the same fixture. As another example, visor 41 may be steeper or more shallow than illustrated.

As another example, fixture components may differ in composition. For example, rather than formed polymer with surfaces that are metallized, visor 41 and reflector 24 may comprise formed and polished aluminum.

It is of note that, as previously stated, a composite beam may comprise any number of individual beams each of which may be adjustable in terms of shape, size, intensity, aiming and/or orientation relative to the fixture, or otherwise. Further, any combination of various types and designs of optical elements (i.e., LED, visor, and reflector) may be used in subassembly 20 to achieve a desired composite beam.

As another option, the portion of fixture 10 housing power regulating devices (see the lower housing portion of FIG. 2 containing panel 13) may be thermally isolated from the portion of fixture 10 housing subassembly 20 (see the upper housing portion of FIG. 2 containing lens 15), or may be remotely located (e.g., in a separate enclosure affixed to pole 11). This may be done for a variety of reasons; particularly, to prevent heat emitted from LEDs 22 from damaging said devices, or to allow easy access to said devices for servicing or otherwise.

What is claimed is:

1. A method of lighting a target area comprising:
   a. determining the size of and desired illumination level at the target area;
   b. developing a lighting fixture to provide illumination of the determined size and illumination level by selection of one or more of:
      i. light source;
      ii. visor;
      iii. reflector;
      iv. position of visor or reflector relative to the light source;
      v. position of the fixture relative to the target area;
   c. wherein the lighting fixture includes a plurality of light sources, visors, or reflectors at least one of which is interchangeable or adjustable; and
   d. illuminating the target area with the developed lighting fixture.

2. The method of claim 1 further comprising, if determined to be needed or desired, changing selection of the light sources, visors, reflectors, position of visor or reflector relative to the light source, or position of the fixture relative to the target area after illuminating the target area.

3. A method of illuminating a target area comprising:
   a. designing an illumination plan for the target area;
   b. selecting one or more light fixtures to produce a composite beam to be used in the illumination plan, at least one of the one or more light fixtures comprising a housing in which are mounted one or more solid state light sources, each of the one or more solid state light sources having a light output distribution type;
   c. each of the one or more solid state light sources having an optic system being adjustable relative to the housing or interchangeable to selectively alter at least one parameter of its light output distribution type, the at least one parameter comprising:
      i. number of reflective surfaces in the optic system; or
      ii. orientation of the optic system relative to the light source;
   d. so that the composite beam of the one or more fixtures can be selectively adjusted by individual selective alteration of the at least one parameter of one or more light sources.

4. The method of claim 3 wherein the composite beam comprises a standard light distribution type.

5. The method of claim 3 wherein the composite beam comprises a customized light distribution type.

6. The method of claim 3 wherein the at least one parameter further comprises:
   a. type of light source; or
   b. design of reflective surfaces in the optic system.

7. The method of claim 3 wherein the optic system can include one or more of:
   a. a light distribution member; and
   b. a light blocking member.

8. An apparatus for producing a light distribution pattern comprising:
   a. a plurality of solid state light sources;
   b. a housing;
   c. a mount in the housing for each of the plurality of solid state light sources;
   d. the mount allowing:
      i. interchange or substitution of one or more components of an optic system for each of the light sources; and
      ii. adjustment of the optic system relative to the mounting location in the housing;
   e. so that the light distribution pattern can be selectively shaped, distributed, or directed.

9. The apparatus of claim 8 wherein the solid state sources are LEDs.

10. The apparatus of claim 8 further comprising an adjustable mounting interface on the housing for mounting the housing to a supporting structure.

* * * * *